J. B. KIRBY

CLOTHES WASHING MACHINE

Dec. 8, 1931.

Re. 18,280

Original Filed Jan. 28, 1929

James B. Kirby
Inventor
by Smith and Freeman
Attorneys

Reissued Dec. 8, 1931

Re. 18,280

UNITED STATES PATENT OFFICE

JAMES B. KIRBY, OF WEST RICHFIELD, OHIO

CLOTHES WASHING MACHINE

Original No. 1,741,191, dated December 31, 1929, Serial No. 335,490, filed January 28, 1929. Application for reissue filed March 28, 1931. Serial No. 526,076.

This invention relates to clothes washing machines and has for its object the provision of a new, improved, and simplified oscillating agitator which shall wash the clothing at least as effectually as heretofore, and shall also effectually prevent articles of clothing from working underneath the agitator where they may be torn and abraded by contact with the bottom of the tub. Another object of the invention is the provision of an agitator which shall to some extent tend to draw the clothes into operative relation with its upper surface; the provision of a machine all parts of which shall be self-draining and devoid of pockets in which washing liquid may collect; while further objects and advantages of the invention will become apparent as the description proceeds.

Figure 1:
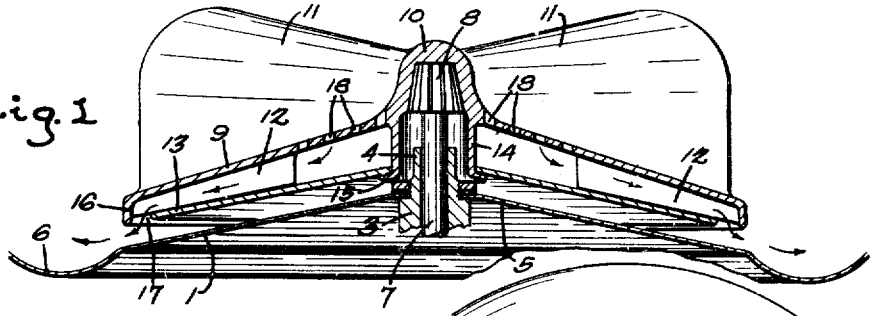
Figure 2:
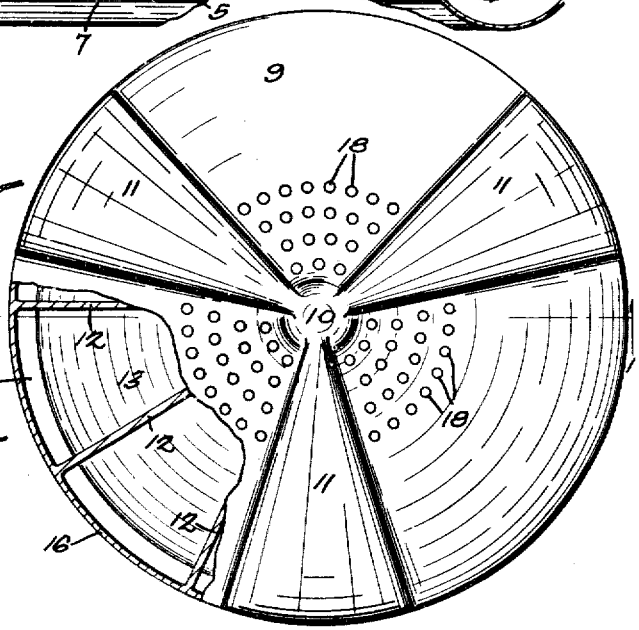

In the drawings accompanying and forming a part of this application I have shown certain physical forms in which my inventive idea can be embodied. Fig. 1 is a vertical sectional view through a preferred form of my improved agitator showing the same in operative position with reference to the bottom of a tub or washing compartment; Fig. 2 is a top plan view of the agitator shown in Fig. 1; and Figs. 3 and 4 are sectional views of modified forms of my invention, the form shown in Fig. 3 being copied from my application Serial No. 694,899, filed February 25, 1924, and that shown in Fig. 4 being copied from my application Serial No. 281,455, filed May 29, 1928; and Fig. 5 is a section taken on the line 5—5 of Fig. 4, and certain of the claims herein originated in my application filed May 14, 1927, Serial No. 191,483.

Figure 3:
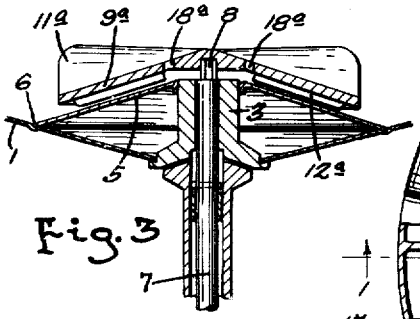
Figure 4:
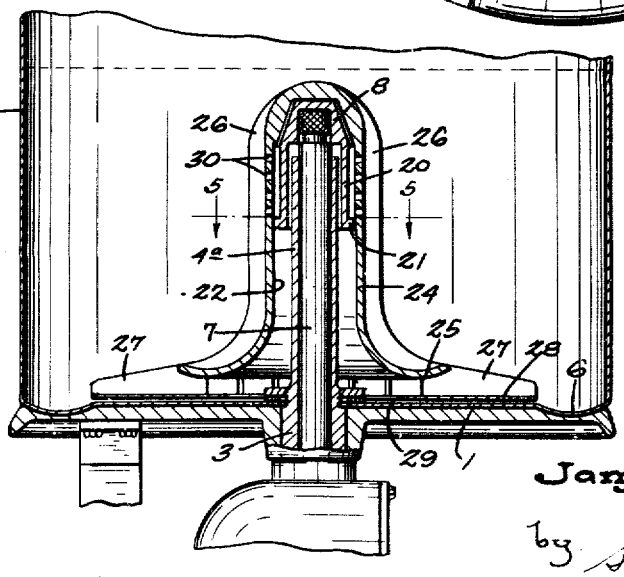
Figure 5:
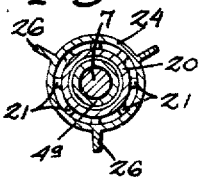

The washing machine here shown for purposes of illustration comprises a liquid-holding tub or casing having a bottom wall 1, and a side wall 2, the former having at its center a vertical, hollow, bearing-sleeve 3 which preferably rises more or less above the bottom as shown at 4 in Fig. 1 and $4^a$ in Fig. 4. In Figs. 1 and 3 the center part of the bottom 1 is elevated gradually as shown at 5 to define a kind of shallow cone, although in Fig. 4 this portion is left flat. In each case, however, this central portion is surrounded by a shallow annular depression 6 adapted to catch such articles as buttons, pins, marbles and the like.

Rotatably journaled in the sleeve 3 is an upright shaft 7 formed at a point above the sleeve 3 with a suitable driving head 8 on which the agitator is detachably mounted. In the form of the invention illustrated in Figs. 1 and 2 this agitator comprises a downwardly flaring, circular plate 9 formed at its center with a hollow hub 10 which constitutes a socket for the driving head 8, and also formed on its upper face with clothes rubbing and liquid agitating provisions of any suitable number and shape. In the present embodiment I have represented these as three radiating round-topped humps 11 of considerable size, although it is equally within my invention to use only one, or two, or even more than three, and to make them of any desired shape, size and spacing. The bottom of the plate 9 is formed with a plurality of depending radial blades 12, to which is tightly secured a circular shield-plate 13, spaced from the plate 9 so as to define a liquid passage. To hold this shield plate in place I have shown the plate 9 as formed at its center with a depending cylindrical skirt 14 spaced from the inner ends of the blades 12, but extending beyond those blades in such wise as to enable it to project through a circular aperture in the center of the plate 13, and afterwards to be spun over as shown at 15 to hold said plate tightly in place. The plate 13 preferably slants outwardly from the hub so as to shed water freely. I have shown the outer edge of the plate 9 as formed with a depending circumferential flange 16 overlapping the ends of the blades 12, in which case the plate 13 is terminated at a sufficient distance from this flange to define a peripheral slot 17 allowing the egress of washing liquid. The plate 9 is formed in or adjacent to the hub 10 with perforations 18 for the admission of washing liquid. The shaft 7 being oscillated vigorously about its axis as customary in such machines, the centrifugal force exerted upon the adjacent liquid by the blades 11 and 12 ejects the same past the margin of the plate 9 and over the bottom of the tub, thereby effectually opposing the ingress of articles of clothing beneath the agitator.

In the form of the invention shown in Fig. 3 the plate $9^a$ is formed at its top with a plurality of plain radial blades $11^a$ which produces radial movement of the liquid over the top of the plate. Perforations $18^a$ allow ingress of liquid through the plate near the center whence it is ejected peripherally by the action of the blades $12^a$ with which the bottom of that plate is provided. No bottom plate is used but the bottom-blades sweep closely over the bottom 5 of the tub.

In the form of the invention shown in Fig. 4 the exterior of the driving head 8 is formed with a depending, hollow, cylindrical sleeve 20 surrounding and spaced from the upper end of the sleeve $4^a$ and forming therewith an air bell. The lower end of the sleeve 20 is formed with spaced fingers 21 receiving in steadying relation the cylindrical inner wall 22 of the hollow hub 24. At its lower end this hub is flared outwardly to produce a circular plate 25. The hub is formed exteriorly with a plurality of spaced radial blades 26, and at the bottom of the plate 25 is also provided a plurality of radial vanes 27. Secured to the bottom faces of these vanes is a circular plate 28 closely overlying the bottom 1 of the tub and having a central aperture 29 through which the sleeve $4^a$ passes freely. The body of the hub is formed between the ribs 26 with perforations 30 for the ingress of washing liquid which is ejected by the vanes 27. The latter in Fig. 4 project laterally beyond the disk 25 to assist in the washing action.

As a result of the radial currents of liquid produced by this agitator the clothes are brought into close engagement with the washing part thereof and at the same time deflected away from the gap beneath it, thereby preventing injury to the clothing while permitting wide manufacturing tolerance. This deflection is equally accomplished whether the currents arise above or beneath the plate or both above and beneath the same. Also the device is free from danger of catching buttons and other foreign articles, or of retaining washing liquid. It will be understood that many changes in detail can be made within the scope of my invention and I do not limit myself as specifically recited in my several claims which I desire may be construed broadly, each independently of limitations contained in other claims.

Having thus described my invention what I claim is:

1. In a clothes washing machine, in combination, an upright tub, an agitator located therein adjacent to the tub bottom and oscillatable about a vertical axis, said agitator having an outwardly and downwardly flared base plate underlying the clothing in said tub and spaced above the tub bottom, means traversing the tub bottom for supporting and operating said agitator, and substantially radial upright blades carried by the upper face of said base plate and increasing in their vertical dimension from the center toward the margin of said plate, the tub bottom being depressed outside of the agitator whereby ingress of articles beneath said agitator and entanglement of fabrics with said operating means is opposed.

2. In a clothes washing machine, in combination a tub, an agitator located therein adjacent to the tub bottom and oscillatable about a vertical axis, said agitator underlying the clothing in said tub, and means carried by said agitator and actuated by the oscillation thereof for discharging liquid laterally from beneath the margin of the agitator whereby ingress of articles of clothing beneath the agitator is opposed.

3. In a clothes washing machine, in combination, a tub, an agitator located therein and oscillatable about a vertical axis, said agitator comprising a plate having its margin adjacent to the tub bottom, projecting elements carried by the top face of the plate, and means carried by said plate and actuated by the oscillation thereof for discharging liquid laterally from beneath its margin whereby ingress of articles of clothing beneath the agitator is opposed.

4. In a clothes washing machine, in combination, a tub, an agitator located therein and oscillatable about a vertical axis, said agitator comprising a plate having its margin adjacent to the tub bottom, projecting elements carried by the top face of the plate and blades beneath said plate adapted to displace liquid centrifugally as the agitator is oscillated, said plate being apertured at a distance from its margin for admission of washing liquid.

5. In a clothes washing machine, in combination, a tub, an agitator located therein and oscillatable about a vertical axis, said agitator comprising a plate having its margin adjacent to the tub bottom, projecting elements carried by the top face of the plate, said plate having one or more apertures for washing liquid at a distance from its margin, and blades beneath said plate for forcing such liquid laterally out across the tub bottom.

6. In a clothes washing machine, in combination, a tub, an agitator comprising a metal plate covering only a portion of the tub bottom and provided with a socket opening through one face for the operating shaft, said plate having apertures therein for the passage of washing liquid therethrough, and means operative upon oscillation of said agitator for causing an outflow of liquid from beneath said plate.

7. An agitator for clothes washing machines comprising a plate having at its center a socket whose axis is substantially normal to the plane of the plate, clothes-rubbing and liquid-agitating provisions on the opposite side of said plate from the socket, and radial blades on the same side of said plate with said socket, said plate having apertures between said blades.

8. An agitator for clothes washing machines comprising an upwardly facing metal plate having a socket on its lower face for an operating shaft and also having apertures therethrough, and means for causing washing liquid to flow through said apertures from the upper to the lower face of said plate as the agitator is oscillated and to be discharged around the margin of said agitator.

9. An agitator for clothes washing machines comprising a plate having liquid-agitating and clothes-rubbing provisions on one face and a socket opening through the other face, a circular shield plate concentric therewith and spaced from the last named face, and radial vanes between said plates, said first plate being apertured for ingress of washing liquid and said second plate having its margin spaced from the margin of said first plate for the egress of such liquid.

10. In a washing machine, a tub, an agitator located inside said tub having clothes-rubbing provisions on its upper face, said agitator located closely adjacent the bottom of the tub, and being apertured for the passage of liquid therethrough, means for oscillating said agitator, and means carried by said agitator and operative by said oscillation for drawing liquid in through such aperture or apertures and discharging it laterally across the tub bottom from beneath the margin of said agitator whereby entrance of clothing beneath said agitator is opposed.

11. In a clothes washing machine, in combination, a casing, and a dasher journaled therein, said dasher having a plate adjacent to the casing bottom, a plurality of radial vanes carried by the upper face of said plate, and a second plate located on top of said vanes, said second plate having blades on its upper face and also having a central, hollow elevated portion formed with water-admitting apertures.

12. In a clothes washing machine, in combination, a casing, and a dasher journaled therein, said dasher comprising a pair of vertically-spaced, concentric, circular disks, and radial vanes between said disks, the upper disk having an elevated hollow portion formed with external ribs and perforations between the ribs.

13. In a clothes washing machine, a tub, an oscillatable dasher mounted therein upon a vertical axis, said dasher having a central socket opening downwardly, a driving shaft traversing the bottom of said tub and having its upper end fitting in said socket, said dasher having a plate portion which extends laterally in all directions adjacent the bottom of the tub, blades carried by the upper face of said plate, and radial vanes carried by the lower face of said plate.

14. In a clothes washing machine, a tub, an oscillatable dasher mounted therein upon a vertical axis, said dasher having a central socket opening downwardly, a driving shaft traversing the bottom of said tub and having its upper end fitting in said socket, said dasher having a plate portion which extends laterally in all directions adjacent the bottom of the tub, blades carried by the upper face of said plate, and radial vanes carried by the lower face of said plate, said dasher having perforations near its axis to permit washing liquid to circulate downwardly near the tub center and outwardly between said vanes.

15. An agitator for clothes washing machines having a central socket for a driving shaft, a plate to underlie the clothes coaxial with said socket, blades on the top face of said plate to agitate the clothes, and blades on the bottom face of said plate.

16. An agitator for clothes washing machines having a central socket for a driving shaft, a plate to underlie the clothes coaxial with said socket, blades on the top face of said plate to agitate the clothes, and blades on the bottom face of said plate, said dasher having perforations near its axis to permit washing liquid to circulate downwardly near the center and outwardly between said vanes.

17. In a clothes washing machine, a container for clothing and liquid, an oscillatable dasher mounted therein on a vertical axis and having at its lower end a flaring plate which terminates in a cylindrical flange, and the container bottom having a central elevation rising into said plate, and also having an outwardly and downwardly slanting portion outside the margin of said plate.

18. In a laundry machine, a tub, and an oscillatable dasher mounted on a vertical axis inside said tub and having at its lower end a plate close to the tub bottom, the bottom of said tub being annularly depressed outside the margin of said plate to constitute a trough, the inner side of said trough slanting outwardly and downwardly from said plate.

19. In a laundry machine, a tub, an oscillatable dasher mounted on a vertical axis inside said tub and having at its lower end a plate recessed beneath and having its margin close to the tub bottom, the bottom of said tub being annularly depressed outside the margin of said plate to a level below that of the plate margin and also having a central tapering elevation projecting upwardly inside the recess of said plate to a height above the level of the plate margin.

20. In a washing machine, a tub including side walls and a bottom portion having a central conical elevation by which it is stiffened, and a water agitating element having radial blades and a base plate overlying and spaced above the tub bottom so as to swing freely over the same, said plate being hollowed out beneath to receive said conical portion of the tub bottom, said element being oscillatable relatively to said tub about a vertical axis.

21. In a clothes washing machine, a container for clothes and liquid, a vertical shaft traversing and journaled in the bottom of said container, and an oscillatable dasher mounted in said container on a vertical axis and fastened to said shaft, said dasher having a circular base and a washing vane projecting upwardly therefrom, the bottom of said container having a circular portion located close to the rim of said base and also falling away outside of said rim in all directions.

22. In a clothes washing machine, a container for clothes and liquid, a vertical shaft traversing and journaled in the bottom of said container, and an oscillatable dasher mounted in said container on a vertical axis and fastened to said shaft, said dasher having a circular base whose rim is lower than its center, the bottom of said container having its central portion elevated above the level of said rim and its portions outside of said rim falling away below the level of said rim.

23. In a washing machine, a tub comprising side walls and a bottom, the center of said bottom being elevated with relation to the surrounding part, a vertical shaft transversing the elevated portion of said bottom and an oscillatable element comprising a disk disposed adjacent to the bottom of the tub and having its bottom hollowed out and surrounding said elevated portion, and a bearing sleeve surrounding said shaft and secured to said bottom in leak-proof relation, said disk having a plurality of water agitating blades on its upper surface.

24. In a washing machine, a tub having side walls and a sheet metal bottom, the latter being strengthened by means of an elevated reinforcing portion, and an oscillatable member comprising a base plate hollowed out for the reception of said elevated portion and spaced slightly above the bottom of the tub, and water agitating blades carried by the upper face of said base plate.

25. A washing machine having in combination a tub comprising side walls and a sheet metal bottom, a portion of said bottom being elevated with respect to the remaining portions and formed with an aperture in its upper part, a vertical bearing secured in said aperture, a shaft journaled in said bearing, and an agitator carried by said shaft, said agitator having a base plate spaced above and closely overlying the tub bottom and hollowed out beneath for the reception of said elevated portion, and water agitating blades carried by the upper face of said base plate.

26. A washing machine including an open-topped tub having upright side walls and a bottom, said bottom having an integral slanting walled portion which is elevated with respect to the surrounding portions, an oscillatable dasher comprising a downwardly flaring circular disk which overlies said elevated portion and has on its upper face a plurality of blades adapted to agitate the washing liquid, and means working through the top of said elevated portion and operatively engaging said agitator to oscillate the same, said dasher being hollowed out beneath for the reception of said means and the tub bottom falling away outside of said dasher to define an annular trough.

27. In a clothes washing machine, a container for clothes and liquid, a vertical shaft transversing and journaled in the bottom of said container, and an oscillatable dasher mounted in said container on a vertical axis and fastened to said shaft, said dasher having a circular downwardly flaring base and a washing vane projecting upwardly therefrom, and a circular member carried by said container extending upwardly into said base and adjacent to the rim thereof.

28. In a washing machine, a container having a slant-topped elevation in its bottom and a vertical bearing substantially coaxial therewith, a vertical shaft in said bearing, a dasher carried by said shaft, said dasher comprising a base plate having its margin depending to a lower level than its center and having water agitating blades on its upper face, said elevation projecting into said base plate to a level above that of the plate margin.

29. A clothes washing machine having in combination, a container, an agitator within said container, said agitator comprising a hollow circular base part which extends laterally close to the bottom of the container and underlies the clothing therein, the margin of said base part depending to a lower level than the portions nearer the center thereof and said agitator having a central elevated hollow portion, the container bottom having a slant-sided elevation rising into the base part of said agitator above the margin thereof, a hollow vertical sleeve located in the center of said elevation, a shaft traversing the bottom of said container and journaled inside said sleeve, driving mechanism for said shaft beneath said casing and operative connections between said shaft and agitator.

30. An agitator for clothes-washing machines, comprising a base plate having its upper face downwardly and outwardly sloped from its center substantially to its margin and thereby being devoid of water pockets, said plate being hollowed out beneath, and blades projecting above said upper face and increasing in vertical width toward the margin of said disk.

In testimony whereof I hereunto affix my signature.

JAMES B. KIRBY.

DISCLAIMER

Re. 18,280.—*James B. Kirby*, West Richfield, Ohio. CLOTHES WASHING MACHINE. Patent dated December 8, 1931. Disclaimer filed February 4, 1939, by the trustee, *The Apex Electrical Manufacturing Company*, and the assignee, *Industrial Improvements Incorporated*.

Hereby disclaim claims 24, 25, and 29 from the specification of said patent.
[*Official Gazette March 14, 1939.*]